Figures 1, 5:
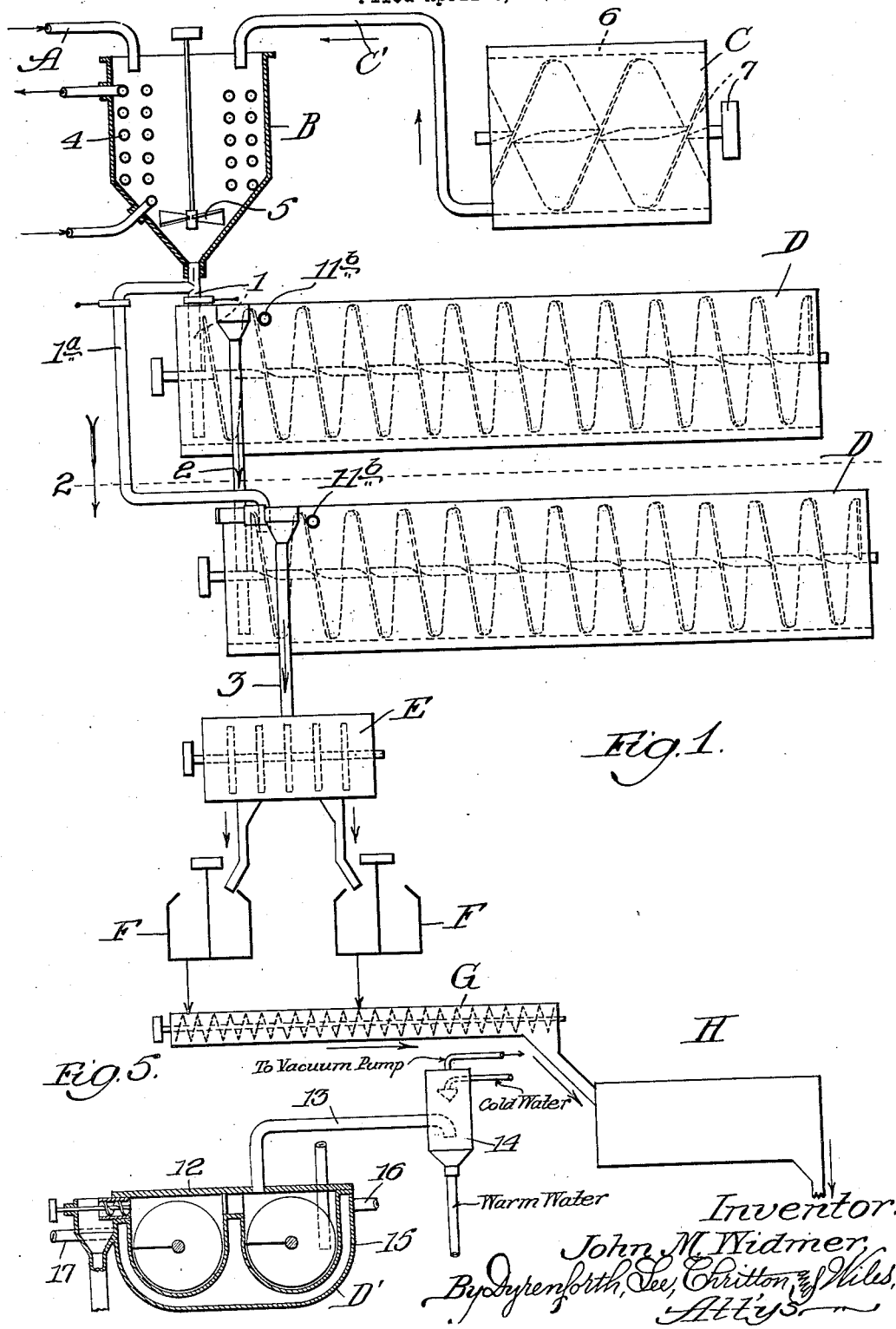

Feb. 25, 1936.  J. M. WIDMER  2,032,160

SUGAR MANUFACTURING PROCESS

Filed April 4, 1932   2 Sheets-Sheet 1

Inventor:
John M. Widmer,
By Dyrenforth, Lee, Chritton & Wiles,
Att'ys.

Patented Feb. 25, 1936

2,032,160

UNITED STATES PATENT OFFICE 2,032,160

SUGAR MANUFACTURING PROCESS

John M. Widmer, Cedar Rapids, Iowa, assignor to Penick & Ford, Ltd., Inc., New York, N. Y., a corporation of Delaware Application April 4, 1932, Serial No. 603,151

19 Claims. (Cl. 127—58)

This invention relates to the manufacture of crystallized sugars, and involves a novel method of effecting crystallization of sugar liquors which enables the time for effecting such crystallization to be greatly shortened, with consequent reduction in the amount of equipment and lessening of manufacturing costs.

The invention finds an extremely useful application in the manufacture of refined crystallized anhydrous and/or hydrate dextrose, from starch-converted liquors. Generally, however, the invention is especially applicable, with advantageous results, to the purpose of effecting crystallization of sugar liquors containing impurities which tend strongly to retard or prevent crystallization as contrasted with liquors of higher purity, or liquors carrying impurities having less tendency to prevent ready crystallization.

There are two methods of effecting crystallization which are well known to the sugar industry: (a) "boiling to grain" in a vacuum pan and developing the massecuite to render it suitable for the purging operation; and (b) "boiling blanc" to produce a proper concentration, and then treating the concentrated sugar liquor, usually after a cooling operation, in a crystallizer under proper temperature conditions to effect crystallization, usually in motion, whereby the massecuite is prepared for the purging operation, as, for example, in a centrifugal machine.

The present invention utilizes in a novel and highly efficacious manner, certain principles which have long been known in the sugar industry, but which, hitherto have been utilized in such manner that a portion only of the benefits derivable therefrom have been realized.

The principle of crystallization in motion has been used in the industry for many years; the principle of employing seed, either in the form of sugar, or in the form of massecuite containing growing crystals, to induce crystallization of properly concentrated sugar-liquor, likewise has been practiced for many years; and the principles pertaining to relations of purity, concentration and temperature, degree of supersaturation, etc., as affecting crystallization, likewise have been pretty well understood for years.

It is the purpose of the present invention, to utilize these known principles in such relation and such manner as to enable greatly improved results to be obtained. This is rendered possible by the discovery of a novel principle, namely, that it is possible to maintain a main body of crystal-laden massecuite under crystal-growth promoting conditions at a stage approaching the finished condition; withdraw therefrom relatively small portions, or decrements, of finished massecuite; and supply to and mix with the main body of massecuite undergoing development make-up nourishing sugar-liquor in sufficient quantity to replenish the body of massecuite undergoing development.

The novel principle of operation finds its best embodiment in a continuous process, according to which a relatively small stream of finished massecuite is continually withdrawn, and a relatively small stream of nourishing sugar-liquor is continually fed to the developing body of massecuite in sufficient quantity to replenish said body.

It is easily possible, by the improved process, to nourish and develop the crystals in the body of massecuite undergoing development to such size and strength that purging and washing in a centrifugal machine may be quickly and effectively accomplished with resulting sugar of very high purity.

Preferably, a small percentage of a separately prepared massecuite containing medium, or small sized crystals is mixed with the sugar-liquor which is fed to the body of massecuite undergoing development in the manner suggested above. For example, 4% of seed-magma containing medium sized crystals may be mixed with the sugar-liquor which serves to replenish the body of massecuite undergoing development. The seed-magma ordinarily will be 40% to 50% solid-phase, and the purpose is to supply fresh nuclei to the body of massecuite undergoing development, thus enabling the process to be perpetual, if desired.

In the preferred practice of the invention, the massecuite undergoing development is continually recycled very slowly through a circuit which is maintained at a suitable temperature; a relatively small stream of replenishing sugar-liquor is fed to the circuit at one point; and a relatively small stream of finished massecuite is withdrawn from the circuit at another point which is remote by line of flow from the point at which the sugar-liquor is fed into the circuit.

While, as indicated, the invention may be usefully employed in various branches of the sugar industry, an exemplification will now be described illustrating the use of the invention in the manufacture of crystallized dextrose, more specifically dextrose hydrate.

The accompanying drawings illustrate improved apparatus well adapted to the practice of the improved process. In the drawings—

Figure 2:
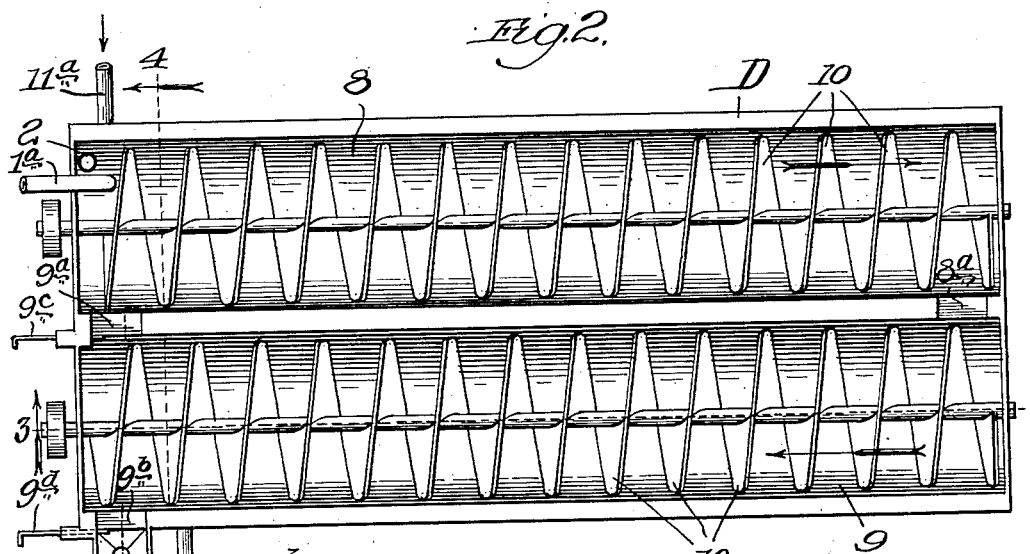
Figure 3:
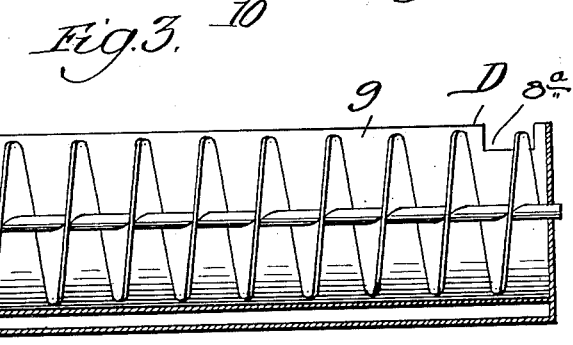
Figure 4:
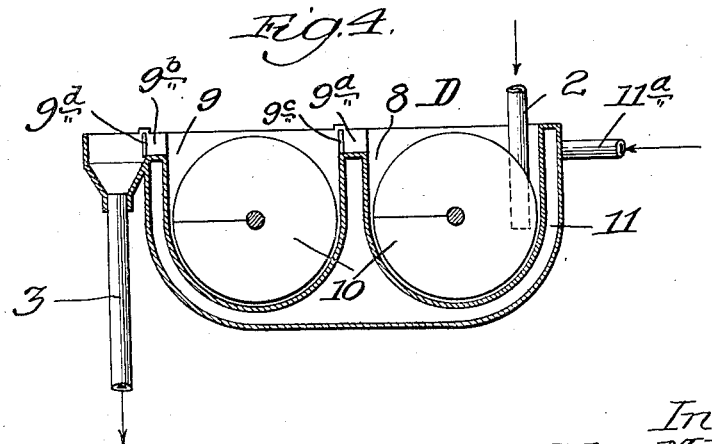

Fig. 1 is a view, diagrammatic in its nature, of apparatus adapted to the practice of the process; Fig. 2 is a plan view of one of the crystallizers shown in Fig. 1, the view being taken as indicated at line 2 of Fig. 1; Fig. 3, a vertical sectional view taken as indicated at line 3 of Fig. 2; Fig. 4, a transverse sectional view taken as indicated at line 4 of Fig. 2; and Fig. 5, a transverse sectional view illustrating a modified form of continuous crystallizer of vacuum type.

In the layout illustrated, A designates a pipe or conveyor through which properly concentrated sugar liquor from a vacuum pan, for example, is supplied; B, a cooler wherein the sugar-liquor which is cooled approximately to the temperature which is to be employed in the crystallizer; C, an auxiliary seed-preparing crystallizer from which magma containing small or medium sized crystals may be delivered, through a pipe C', to the sugar-liquor in the cooler B; D, D, two continuous crystallizers shown arranged in series, one of which may be omitted, if desired, the first of these two crystallizers receiving its supply through a pipe 1 leading from the cooler B, and the second receiving overflow from the first crystallizer through a pipe 2; E, a distributor which receives finished massecuite through an overflow pipe 3 leading from the final crystallizer; F, F, centrifuges where the mother liquor is separated from the crystals and the crystals are washed, if desired; G, a conveyor which receives the sugar from the centrifugals; and H, a dryer, or granulator, where the sugar is dried and any remaining lumps are broken up.

The cooler B is shown equipped with coils 4 through which cooling water may be circulated and with a stirrer 5 for causing circulation of the cooling sugar liquor.

The crystallizer C is provided with a jacket 6 and with a propeller 7 for causing slow motion of the massecuite, or seed-magma, in the crystallizer.

The crystallizers D, D may be identical in construction, as illustrated. While any suitable form of crystallizer may be adopted, suited to cycling and recycling the massecuite undergoing development, the form shown is well adapted to the purpose. Thus, each continuous crystallizer comprises a first conduit 8 leading away from the point where the sugar liquor is fed to the crystallizer; a return conduit 9 parallel with and adjacent to the first conduit; and slowly rotating screw-conveyors 10 in said conduits, serving to mix and convey the massecuite slowly in the directions indicated by the arrows in Fig. 2.

As appears most clearly from Fig. 4, the continuous crystallizer is equipped with a jacket 11 through which either a cooling or a heating medium may be circulated. Thus, either warm water or cool water may be fed to the jacket through a pipe 11a and ejected through a pipe 11b. Since the crystallization of the sugar creates heat, ordinarily it is desirable to circulate moderately cool water to dissipate the thermal units created by crystallization.

The far, or final, end of the conduit 8 communicates through an overflow passage 8a with the adjacent end of the conduit 9. At the front end of the crystallizer, an overflow passage 9a serves to enable the main body of massecuite to pass from the final (near) end of the return conduit into the front end of the first conduit; and an overflow passage 9b serves to enable a relatively small stream of finished massecuite to pass through the discharge pipe 3. Sluice-gates 9c and 9d are indicated to enable the finished massecuite recycled and that discharged to be regulated. That is, the rate of discharge of the finished massecuite may be varied, a corresponding change in rate of feed being made, of course. It is possible, also, to regulate the discharge rate wholly by the feed-rate.

It will be understood that the front portion of the first continuous crystallizer corresponds with the front portion of the second crystallizer illustrated in Figs. 2–4. That is, a suitable return overflow passage 9a and a suitable guarded discharge overflow passage 9b are utilized in the first crystallizer as well as in the second.

In Fig. 1, a branch supply pipe 1a is shown for supplying sugar liquor to the second continuous crystallizer. Sugar liquor may or may not be supplied to the second crystallizer, according to the will of the operator. That is, the second crystallizer may be regarded simply as a continuation of the first crystallizer, and if desired, it may be used wholly to insure the maximum yield of dextrose, for example, to enlarge the sugar crystals undergoing development. Thus, the temperature in the second crystallizer may be somewhat lower than the temperature in the first crystallizer, thus producing a fresh supersaturation, whereby additional sugar will be deposited upon the growing crystals, so that the yield will be increased.

Where factory conditions permit, a single continuous crystallizer of suitable length may be made to serve the whole purpose and to give a maximum yield. If desired, the going and return conduits of each crystallizer may be separately jacketed, so that a lower temperature may be maintained in the return conduit than is maintained in the first or out-going conduit.

As an illustration of the use of the process in producing hydrate dextrose, the following is given as an example:

Starch-converted sugar liquor is concentrated in a vacuum pan suitably to give a reading of about 40° Bé. when cooled to 100° F. and is led through the pipe A to the cooler B, where the sugar liquor is cooled to about 100° F. Such concentration in the vacuum pan produces a supersaturated liquor, and the supersaturation is increased by cooling the liquor before it is sent to the crystallizer. This is important in dealing with the rather low-purity sugar liquors and especially the dextrose sugar liquors obtained directly by ordinary methods of starch conversion. Preferably, although not necessarily, seed-magma is introduced through the pipe C' into the sugar-liquor, preferably to the extent of about 2% of the solid-phase.

In starting the crystallizing operation, it is preferred to fill the first continuous crystallizer D with massecuite containing about 40 to 50% solid-phase sugar in the form of medium sized crystals. Such massecuite may be prepared, for example, in crystallizers like the crystallizer C and may be fed directly to the first continuous crystallizer.

The apparatus being then in condition for carrying on the normal operation, in which a large body of massecuite is cycled and recycled, properly concentrated sugar-liquor preferably containing small or medium sized crystals to the extent of, say, 2% solid-phase, is fed slowly from the cooler B to the first continuous crystallizer D. The operation continues, with overflow of a relatively small percentage of massecuite from the first crystallizer to the second and with overflow (when full) of a relatively small percentage of massecuite from the second crystallizer to the centrifugals.

In the illustration given, the second continuous crystallizer serves, in effect, as a continuation of the first crystallizer, but utilized to increase the yield of dextrose, due to a fresh supersaturation created by lowering the temperature. If desired, fresh sugar-liquor may be fed through the pipe 1ª to the initial end of the first conduit of the second crystallizer, thus enriching the liquor which is then utilized to nourish the crystals in the second crystallizer. The second crystallizer is not to be regarded as vital; it may be omitted, if desired.

An alternative method of starting the operation may be stated as follows:

The discharge to the second crystallizer may be stopped, and the first continuous crystallizer D may be filled with properly concentrated sugar-liquor, preferably containing seed, obtained from the cooler B. The feed to the first continuous crystallizer may be discontinued, and the massecuite circulated and recirculated until there shall have been produced about 40 to 50% solid-phase in the massecuite, whereupon the discharge from the first crystallizer to the second crystallizer, may be permitted to operate. Thereupon, the operation may be continued in the manner set forth above, discharge to the centrifugals commencing after the second crystallizer D has been filled.

The amount of massecuite withdrawn from the crystallizer or crystallizers may be varied. Preferably, about 10% of the main body of the massecuite is discharged from the crystallizer and the remaining nine-tenths recirculated and supplied with nourishing liquor in sufficient quantity to make up for the amount withdrawn from the circuit. Thus, it is preferred to recirculate about 90% of the magma which would be suitable to take to the centrifugal. Such a massecuite, ordinarily, in the manufacture of dextrose hydrate, will contain about 50% of solid-phase sugar. The influence of so large a mass of solid-phase in the massecuite undergoing crystallization is such as to greatly accelerate the rate of the crystallization. Thus, it is possible to effect crystallization of dextrose in approximately one-third of the time heretofore required in the best known practice. According to the best known practice, it has been possible, by allowing say 30 to 40% of finished massecuite (sometimes called "foots") to remain in the crystallizer as induction seed for the next batch, to obtain about 35% of the crystallizer capacity in twenty four hours. In the practice of the improved process herein described, it is possible to withdraw finished massecuite from the crystallizer to the extent of approximately 100% of the cubic capacity of the crystallizer, per twenty four hours.

While it is preferred to withdraw about 10% as finished massecuite and recirculate the remaining 90%, variations in percentage are quite permissible. It is practicable to reduce the withdrawn percentage to about 5%, or to increase it to about 30%. Some sacrifice in the rate of crystallization results by increasing the percentage withdrawn to as high a point as 30%.

The continuous withdrawal of a relatively small stream of finished massecuite may be regarded as removing the massecuite in relatively small decrements, while the continuous inflow of a relatively small stream of nourishing make-up liquor may be regarded as furnishing a supply in relatively small increments. It is possible, of course, to interrupt the outflow at intervals and to interrupt the inflow at intervals, while still obtaining largely the benefits of the improved process. In practice, such interruptions are not desirable. By continuously feeding a small supply of sugar liquor to a large body of massecuite undergoing development, the purity of the incoming stream is immediately affected by the lessened purity of the body of massecuite to which the sugar liquor is supplied. In other words, only small changes in purities result, and this is desirable to prevent a tendency to form fresh nuclei in very large quantities, a factor which ordinarily is difficult to control. Also, the change in temperature in the mass undergoing crystallization is kept within rather close limits, so that another factor which otherwise might create false grain is obviated.

In the manufacture of carbohydrate sugars, to which the present process pertains, the massecuite, nearing the finished state, comprises a large percentage of crystals, or small crystal masses, and the mother liquor in which these crystals are suspended, the mother liquor consisting of a water solution of sugar and the usual impurities of the sugar liquor being crystallized. Such a massecuite is of heavy viscous character and the nature of the mother liquor is such that it is wholly impracticable to effect the separation of the mother liquor and the crystals, in the present process, during the circulation of the massecuite in the crystallizer. In other words, it is not possible, in the present process, to withdraw the mother liquor from the circuit at one point in the circuit and "salt out" or withdraw the crystals separately from the crystallizing circuit. To the contrary, the massecuite, as above defined, is withdrawn from the circuit as an entity, and sent to the centrifuge, where the separation of the mother liquor from the crystals is effected. Dextrose and levulose are examples of reducing sugars which may have different forms, or isomers. Later, reference is made to an adjustment of the pH of the concentrated sugar liquor, preparatory to effecting crystallization; and this is believed to be of special importance in dealing with the crystallization of dextrose and levulose.

The improved process is readily operated without danger of lack of uniformity in results. The crystals grow to a very appreciable size, which is a desirable consideration in the manufacture of dextrose, as is true also when dealing with the less pure liquors in the sucrose branch of the sugar art. The same may apply to levulose.

It is understood, of course, that a very wide range of variations in concentration, purity, and temperatures is allowable, depending upon the product to be produced, the purity of the sugar liquors available, etc. The hydrogen-ion concentration of the liquor to be crystallized is also an important factor, and particularly so in effecting crystallization of dextrose. The usual practice at the present time in producing refined crystallized dextrose is to use a sugar liquor having a pH of about 4 to 4.5. It has been found, however, that in the practice of the present process, crystallization is accelerated by adjusting the pH to from 6 to 7, all other factors being equal. It is usual to effect conversion of starch to sugar liquor by acid-hydrolysis, then clarify the liquor by filtering through charcoal or boneblack and then concentrate the liquor in a vacuum pan to the desired concentration. As a feature of the present invention, it has been found advantageous to add to the liquor at the time of final evaporation, or just prior thereto, such quantity of soluble alkaline substance (for example trisodium phosphate, sodium carbonate, etc.) as will give to the liquor a pH of from 6 to 7. The employment of this feature of the invention is not limited to use in connection with the continuous crystallization method, however.

The adjustment of the pH to practically complete neutrality is of special importance to facilitate the crystallization of dextrose, for example, which may crystallize in various forms, or isomers. It seems that a pH of 6 to 7 speeds up the change from one isomer to another (the form to be crystallized); and while this is important in the crystallization of dextrose generally, for example, it is especially so in a process which greatly speeds up the crystallization of dextrose, as does the above-described process. In the long-time cycle, which, after conversion of starch to sugar liquor, precedes the final evaporation of the liquor to the final crystallizing density desired, the usual pH of 4 to 5 is desirable and should be used. During this long-time cycle, the liquor is in highly heated condition, for the most part, and a certain degree of acidity is required to prevent injury to the sugar, such as caramelizing and blackening. Thus, the practice is to take the hot liquor from the converter, neutralize it to a pH of 4 to 5, purify the liquor by passing over bone char or the like, and then send the liquor to the triple-effect evaporator, where very high temperatures and rather prolonged operating periods are the rule. For example, in the first effect, the vacuum may be low and the temperature may be, for example, 180° F.; and in the second effect, the temperature may be 160° F.

In the finishing pan, where the liquor is given its final concentration, preparatory to crystallizing, the vacuum is high, the temperature ordinarily is from 120° F. to 140° F., and the period of cooking is relatively short, say about one hour. Accordingly, the adding of the alkali to adjust the pH to a substantial neutrality may be safely accomplished just before the final concentration, during the last few minutes of the final concentration, or at the end of the final concentration. That is, the adjustment should be made at a time when it will not result in injury to the sugar and by way of preparation for the facilitating of the crystallizing operation.

While it is preferred to feed seed-magma to the continuous crystallizer, as stated above, it is quite possible to operate without this factor. For example, one may operate the crystallizers for a period ranging from several days to two weeks, and may then wholly discharge the material, and may afterward renew the continuous process by introducing a fresh charge containing seed-magma, if desired. Another variation is to vary the temperature at the crystallizer to cause fresh nuclei to be formed (by increased supersaturation), but this is a more hazardous method of procedure, so that the method of feeding in fresh seed-magma in a controlled manner is preferred. Methods of producing seed magma in the crystallizer C, for example, are well known. Such preparation may be done by seeding properly concentrated liquor in the crystallizer C, or even without the use of seed. While the use of some seed-magma has been suggested, any desired percentage may be employed. The small-sized crystals can be readily product in the crystallizer C and then maintained therein indefinitely by keeping the liquor in slow motion at proper temperature and with slight, if any, supersaturation. If the degree of supersaturation in the continuous crystallizer be increased, it may be quite desirable to increase the percentage of seed-magma fed to the continuous crystallizer.

The mother liquor, or spinnings, obtained from the centrifugal machines may be disposed of in any preferred manner. Such spinnings may, for example, be reconcentrated and utilized as the fill-mass for a second crystallizing unit (ordinarily operated at a lower temperature); or the spinnings may be reconverted to increase the purity and may then be used as a source of supply for the crystallizer.

The crystallization of levulose from solutions which contain levulose and dextrose, as obtained by the usual methods of preparing such solution from Jerusalem artichokes or dahlia tubers, or products of inversion from sucrose, will yield purgeable sugar by the use of the improved crystallizing method herein described.

Depending upon the purity and composition of impurities present, variations will be desirable. In general, the same ratios which have proven satisfactory in the crystallization of sugar by means of batch crystallization are applicable here.

If desired, the recycling principle may be employed by making use of a continuous crystallizer of the form shown, for example, by operating it as a vacuum apparatus. In such case, the use of cooling water may be omitted, and a vacuum may be employed to remove some of the water, maintained at desired temperature, and maintain in a regulated manner, the desired degree of supersaturation, in the massecuite undergoing development. Of course, heat may be applied to the crystallizer, using this mode of operation, if desired, the apparatus employed thus taking the form of a modified vacuum-pan.

In the modification shown in Fig. 5, D' designates a continuous crystallizer provided with a cover 12, a vapor line 13, and a condenser 14. The crystallizer is shown provided with a jacket 15 equipped with an in-flow pipe 16 and an outlet pipe 17. A heating medium, such as warm water, may be circulated through the jacket. The degree of concentration of the sugar-liquor fed to this type of crystallizer, or modified form of vacuum-pan, may be regulated in any desired manner. If desired, the vacuum may be applied to the return-conduit only of the crystallizer.

It may be added that it is preferred to effect the conveying and the mixing of the massecuite by a low-pitch spiral conveyor, as illustrated. Such a conveyor, equipped with a wide or deep spiral, in effect, separates the thick massecuite, which always is near the finished state, into short portions (viewed as longitudinal sections), or substantially isolated sections (separated along any line extending longitudinally of the conveyor). Inasmuch as the increments of nourishing sugar liquor are delivered to the conveyor at the front end thereof, these increments become properly allocated to the corresponding portions of the heavy, crystal-laden massecuite. Consequently, the increment of the nourishing sugar liquor is mixed with its environing portion of the massecuite at one end of the cycle and is carried therewith substantially throughout the length of the cycle, thus giving full opportunity for the available sugar to be deposited upon the environing crystals. Moreover, the intimate mixture of the mass is maintained throughout the cycle.

The process possesses peculiar advantages as applied to the manufacture of refined dextrose, and very greatly expedites the crystallization, as has been pointed out above. In recent years it has been the practice in the dextrose art, where crystallizers are employed, such as are commonly used in the sucrose art, to allow a period of from 3 to 6 days for crystallization to take place. This requires large and expensive equipment. It will be understood, therefore, that a process which will enable the output of the crystallizer to be increased 2 or 3 fold is extremely important in the dextrose art.

It is noteworthy that in the present process the massecuite which is removed from the crystallizer and sent to the centrifuge is a non-classified massecuite. That is, it comprises unclassified sugar crystals and the mother liquor which carries said crystals. It may be said that a minor percentage of the matured or finished massecuite is withdrawn as an entity from the main body of massecuite and sent to the centrifuge. The main portion of the developed massecuite is left in the crystallizer to be used as a carrier for the minor percentage of sugar liquor which is to be crystallized. Obviously, in the preferred embodiment of the process illustrated, the massecuite which is re-circulated has the same characteristics as the withdrawn portion which is sent to the purging machines. It comprises mother liquor and unclassified crystals, since there is no straining of the crystals, no classifying of the crystals, in the operation of the process. Such a heavy, viscous massecuite must be circulated gently and slowly in the manner illustrated and described, or by some analogous method, in order to obtain proper results. Classifying of the crystals (separation of large crystals from small and medium crystals) is not feasible in the practice of a process of this character.

The foregoing detailed description has been given for clearness of understanding only, and no unnecessary limitations should be understood therefrom but the appended claims should be construed as broadly as permissible, in view of the prior art.

What I regard as new, and desire to secure by Letters Patent, is:

1. In the manufacture of sugar, the steps comprising: continuously recycling in a first circuit a main stream of developing crystal-laden massecuite maintained under crystal-growth promoting conditions; diverting from said main stream a relatively small percentage of massecuite and directing it into a second circuit; continuously recycling the diverted massecuite in said second circuit under crystal-growth promoting conditions, at lower temperature; diverting from the second circuit a relatively small percentage of finished massecuite; and feeding to said main stream in the first circuit make-up sugar-liquor of proper concentration to nourish the growing crystals in said main stream.

2. In the manufacture of a crystalline reducing sugar, the steps which comprise: preparatory to effecting crystallization and subsequent to the purification and concentration steps preceding the final evaporation by which the sugar liquor is brought to the desired concentration for effecting crystallization, adjusting the sugar liquor to a pH of 6 to 7; concentrating to the desired density for effecting crystallization as a step in the procedure; and effecting crystallization of the concentrated sugar liquor having the adjusted pH stated in the presence of a large percentage of solid phase, the massecuite being subjected to slow agitation.

3. In the manufacture of a crystallized reducing sugar, a method of effecting crystallization which comprises: as a final step, preliminary to a crystallizing operation, concentrating at relatively low temperature to a desired density for crystallizing a sugar solution having a pH below 5; adjusting the pH to between 6 and 7 at about the time of effecting said concentration; maintaining in slow motion in a crystallizer at suitable temperature a massecuite having dispersed therein a large percentage of solid-phase reducing sugar and a suitable percentage of said concentrated reducing sugar liquor having the above-stated adjusted pH.

4. A process as set forth in claim 3, as carried out by effecting the adjustment of the pH by introducing a soluble alkaline substance into the sugar liquor during the final evaporation treatment.

5. In the manufacture of a carbohydrate sugar, the steps comprising: maintaining under crystal growth-promoting conditions and under continuous mixing and cyclic movement a crystal-laden body of dextrose massecuite; withdrawing therefrom relatively small decrements of finished massecuite as a mixture of crystals and the mother liquor carrying said crystals; and feeding as make-up to and mixing with said body relatively small increments of dextrose solution obtained by acid-hydrolysis of starch which has been neutralized to a pH not above 5, purified, subjected in such acid condition to concentration at relatively high temperatures, then subjected to final concentration to a selected crystallizing density at relatively low temperature and adjusted to a pH of 6—7 as a step preliminary to effecting crystallization, such adjustment having occurred subsequent to the first-mentioned concentration step.

6. In the manufacture of a carbohydrate sugar, the steps comprising: (a) moving through an elongated crystallizer a carrier body of massecuite which is near the finished state; (b) feeding to and admixing with successive portions of the carrier body of nearly finished massecuite, as such portions pass a given point, a minor percentage of sugar liquor not substantially greater than 30% of the mixture formed; (c) and withdrawing at a point remote by flow route from the point of feed a minor portion of said carrier body as finished massecuite comprising crystals and the mother liquor carrying said crystals, the withdrawal rate corresponding approximately with the feed rate.

7. A process as stated in claim 6 as practiced by employing a nearly-finished massecuite (to which the sugar liquor is fed) comprising about 40%—50% solid phase in the form of crystals.

8. A process as stated in claim 6 as practiced by supporting the elongated body of nearly-finished massecuite on its side and applying forwarding and mixing actions simultaneously to a plurality of portions of said body at spaced intervals along said body.

9. A process as stated in claim 6, characterized by spirally dividing and acting upon the nearly-finished massecuite and feeding the sugar-liquor to successive portions of the massecuite-spiral, thus allocating portions of sugar liquor to and mixing the same with successive portions of the massecuite.

10. A process as stated in claim 6, as practiced by moving the massecuite cyclically and repeating the cyclic movement again and again.

11. A process as specified in claim 6, in which a minor percentage of relatively small sugar-crystals, also, are fed to the nearly-finished massecuite which serves as a carrier for the sugar-liquor which is to be crystallized.

12. A process as stated in claim 6, in which the finished massecuite is withdrawn to the extent of 5%–30%, and the sugar-liquor to be crystallized is fed to the remainder of the massecuite at a rate corresponding with the rate of withdrawal of massecuite.

13. A process as stated in claim 6, in which the finished massecuit withdrawn is about 10% and in which the finished massecuite which acts as a carrier for the sugar liquor to be crystallized is about 90% of the mixture comprising the massecuite acting as a carrier and the sugar liquor fed thereto.

14. A process as stated in claim 6, as practiced by feeding with the sugar liquor to be crystallized small crystals to such extent as to constitute about 2% solid phase in the sugar liquor.

15. A process as stated in claim 6, in which the massecuite is a dextrose massecuite and in which the sugar liquor to be crystallized is a dextrose solution.

16. In the manufacture of crystallized dextrose sugar, the steps comprising: cycling and recycling a crystal-laden carrier body of dextrose massecuite, which is near the finished stage; withdrawing from the circuit a minor portion of the carrier body of massecuite in the form of crystals and mother liquor carrying the same, the percentage withdrawn being within the limits of 5%–30%; and feeding to and mixing with the recycled massecuite dextrose sugar liquor in sufficient quantity to maintain the body undergoing treatment.

17. In the manufacture of carbohydrate sugar, the steps comprising: maintaining under crystal-growth-promoting conditions and cyclically moving by forwarding action exerted at a plurality of points in the cycle a crystal-laden carrier body of developed massecuite; withdrawing relatively small decrements of finished massecuite comprising sugar crystals and the mother liquor carrying said crystals; and feeding as make-up to and mixing with said carrier massecuite body at a point remote (by flow-route) from the point of withdrawal corresponding relatively small increments of concentrated sugar-liquor.

18. A process as specified in claim 17, in which the rate of withdrawal is within the limits of 5% to 30% based on the mass of the carrier-body plus the sugar-liquor being crystallized.

19. A process as specified in claim 17, in which the rate of withdrawal is about 10% of the mass comprising the carrier-body and the sugar-liquor undergoing crystallization.

JOHN M. WIDMER.